United States Patent [19]
Bailey

[11] Patent Number: 6,154,691
[45] Date of Patent: Nov. 28, 2000

[54] ORIENTING A SATELLITE WITH CONTROLLED MOMENTUM GYROS

[75] Inventor: David A. Bailey, Glendale, Ariz.

[73] Assignee: Honeywell International Inc., Morristown, N.J.

[21] Appl. No.: 08/923,742

[22] Filed: Sep. 2, 1997

[51] Int. Cl.[7] .................................................. B64G 1/28
[52] U.S. Cl. ............................ 701/13; 701/4; 244/169; 244/176; 244/165
[58] Field of Search ................. 701/13, 4, 8; 244/169, 244/176, 165

[56] References Cited

U.S. PATENT DOCUMENTS

| | | | |
|---|---|---|---|
| 3,813,067 | 5/1974 | Mork | 244/3.22 |
| 3,834,653 | 9/1974 | Perkel | 244/166 |
| 3,968,352 | 7/1976 | Andeen | 701/13 |
| 4,062,509 | 12/1977 | Muhlfelder et al. | 244/166 |
| 4,071,211 | 1/1978 | Muhifelder et al. | 244/165 |
| 4,489,383 | 12/1984 | Schmidt, Jr. | 701/13 |
| 4,567,564 | 1/1986 | Bittner et al. | 701/4 |
| 4,893,254 | 1/1990 | Chan et al. | 700/263 |
| 5,025,381 | 6/1991 | Goodzeit et al. | 701/13 |
| 5,080,307 | 1/1992 | Smay et al. | 244/164 |
| 5,276,390 | 1/1994 | Fisher et al. | 318/568.1 |
| 5,499,320 | 3/1996 | Backes et al. | 700/260 |
| 5,608,634 | 3/1997 | Goodzeit et al. | 701/4 |
| 5,681,012 | 10/1997 | Rosmann et al. | 244/165 |
| 5,692,707 | 12/1997 | Smay | 244/165 |
| 5,806,804 | 9/1998 | Goodzeit et al. | 244/169 |
| 5,862,495 | 1/1999 | Small et al. | 701/13 |

*Primary Examiner*—William A. Cuchlinski, Jr.
*Assistant Examiner*—Olga Hernandez
*Attorney, Agent, or Firm*—Robert E. Greenstien

[57] ABSTRACT

Controlled momentum gyros are rotated to change the attitude of a satellite as rapidly as possible by rotating them along a great circle path on an imaginary spherical surface around the satellite. Adjustments the gyro rotations are made in two directions, along the spherical surface, as the satellite rotates. All the stored angular momentum in the gyros is used to rotate the satellite, rather than limiting the rotation of the gyros to avoid instabilities from singularities in traditional control laws.

5 Claims, 2 Drawing Sheets

ORIENTING A SATELLITE WITH CONTROLLED MOMENTUM GYROS

TECHNICAL FIELD OF THE INVENTION

This invention relates to satellites, in particular, controlling the orientation of a satellite using a plurality of control momentum gyros (CMG).

BACKGROUND OF THE INVENTION

The attitude on an agile spacecraft or satellite is often maintained and adjusted with a control momentum gyro array because those devices provide high torque and torque amplification. A typical CMG is a rotating mass suspend on a gimbal with an actuator to rotate it on the gimbal access, producing a torque (reaction) on the normal to the gimbal axis that rotates the satellite. An array (n>3 CMGs) is often used, allowing spherical orientation control. Each CMG has its angular momentum (h) constrained to the momentum plane swept out by the spin axis as it is gimbaled. For a constant speed CMG the angular momentum is constant and the value is constrained to a circle in the momentum plane. The torque (Q) in that plane is Q=ω×h, where ω is the angular rate applied to the gimbal input and h is the stored angular momentum for the gyro (a function of the gyro moment of inertia J and spin rate Ω, h=JΩ). In the array, the CMGs are located, relative to each other so that the momentum planes are at different angles and by creating different combinations of torques, the satellite can be reoriented.

When a space craft is maneuvered or reoriented in this way, for example to pan a camera between two objects on the surface of the earth as shown in FIG. 2, the CMGs are gimbaled so that a jerk limited acceleration constrained trajectory or some other command shaping function is selected to take the satellite from one orientation to another while minimizing the energy imparted to the bending modes of the satellite. A so-called pseudo inverse control law is used to produce the gimbal rates for each CMG so that the required torque vector is produced. The CMG array angular momentum H is a function or the individual CMG gimbal angles δ. The relationship of δ to H is defined by the Jacobian A.

$$A = \frac{\partial H}{\partial \delta}$$

The A matrix is a 3 by n matrix, where n is the number of CMGs in the array. The controller for the satellite will generate a desired satellite torque Q to bring the satellite to the correct attitude. The rate of change of angular momentum is torque. The Moore-Penrose pseudo inverse is then used to calculate the desired rate of change of the gimbal angles given the desired satellite torque. $\dot{\delta}=A^T(AA^T)^{-1}Q$ The classical way to control a satellite is to take the cross product of the present orientation $\Theta_1$ and the desired orientation $\Theta_2$ resulting in the direction of rotation for an eigin axis rotation. The resulting locus of the orientation ("Old" in FIG. 2) falls along a great circle line on the unit sphere with the satellite at the center.

If all the CMG angular momentum vectors are simultaneously aligned such that the tangents to the momentum circle at the location of the angular momentum vector fall in one plane, all the torques are confined to that plane and no torque will be produced in a perpendicular plane. This produces a "singularity", point of unstable torque control. The singularity occurs when the rank of the A matrix drops from 3 to 2. This produces the singularity in the pseudo inverse. The conventional approach for avoiding the singularity is to constrain the combined CMG momentum of the array—so that the pseudo inverse never produces the singularity. But this means that maximum satellite turning angular momentum is significantly limited to a value below the mathematical sum of the angular momentum from the CMGs, since the angular momentum is the integral of the CMG torque over time, the satellite reorientation takes place more slowly in those directions that produce the singularity. In a point and track satellite system, where an object or location, e.g., on the earth-surface, is viewed and the satellite is then pointed to a new location, those limits on available angular momentum increase the reorientation or pointing time because the possible outputs from the pseudo inverse, which define the reorientation locus of points along the great circle between the two points, must be limited to avoid the singularity as the orientation follows the great circle path.

DISCLOSURE OF THE INVENTION

An object of the present invention is to significantly increase the speed in reorienting a satellite between two objects by utilizing more of the available angular momentum from the CMGs.

According to the invention, the end points on the reorientation locus are constrained, not the trajectory from one point to another. When the satellite is commanded to a new orientation the CMGs are gimbaled to positions that generate the maximum angular momentum in a direction such that it is near the great circle route. Since the CMGs are gimbaled in a way that does not preserve a constant direction torque out of the array at the beginning and the end of the maneuver, a small correction in the direction of the maximum angular momentum has to be made. As the reorientation is made to the new position only small adjustments are made to the angular momentum vector accommodate perturbations in satellite attitude only two axis based on observed satellite movement from an attitude determination system, such an ring laser or fiber optic gyro. As a result, the locus is the curved path ("new") in FIG. 2.

According to the invention, the control of the trajectory is based on six independent variables, maximum angular momentum direction for 2 degrees of freedom, the duration of the maneuver for 1 degree of freedom, the terminating angular momentum from the CMG array, $h_1$, $h_2$, $h_3$ for 3 degrees of freedom which are used to bring 6 satellite parameters to the desired values, final satellite attitude $\Theta_1$, $\Theta_2$, $\Theta_3$, 3 dependent variables and final satellite attitude rate, $\dot{\Theta}_1$, $\dot{\Theta}_2$, $\dot{\Theta}_3$, 3 dependent variables. The direct calculation for the CMG gimbal angles δ for the maximum angular momentum $H_{max}$ means that the gimbals can be moved to the correct angle without having to use a pseudo inverse calculation, and without experiencing a singularity in the control. The trajectory is influenced by the initial attitude of the satellite, the initial satellite attitude rate of change, the stored angular momentum in the CMG array, and external torque disturbances on the satellite.

According to the invention, if the commanded or new satellite orientation $\Theta_{commanded}$ minus the present attitude $\Theta_{present}$ exceeds a threshold value, then the maneuver is large enough to use the $H_{max}$ maneuver, but for smaller movements, the δ for each CMG is computed using the pseudo inverse law, which limits the maximum usable combined momentum, which is not need, however, for small movements.

According to the invention, as the satellite axis is shifted using the $H_{max}$ value, the expected θ is compared with the actual value determined from an inertial measurement unit and any error is used to change the δ applied to each CMG in the array.

According to the invention, the commanded or desired $\theta_{command}$ is compared with actual $\theta_{actual}$ from an attitude sensor, such as an IMU ("inertial measurement unit"), and the error is used to develop the first derivative of gimbal angle δ for each CMG from a pseudo inverse law process. The gimbal rate commands are compared to the CMG gimbal rates, generating a gimbal rate error for each CMG. The gimbal rate control uses the gimbal rate error to generate the command to the gimbal torquer, which gimbals the CMG producing toque for the satellite. If the satellite attitude error is greater than a predetermined value the attitude error, attitude rate command, and actual attitude rate from the attitude rate sensor, such as an IMU is used by the $H_{max}$ control to generate a gimbal position command $\delta_c$ for each CMG. The gimbal position command is compared to the actual gimbal position generating a gimbal position error. The gimbal position error is used by the CMG gimbal position control to generate the gimbal torque command. The gimbal torque command is used by the gimbal torquer to move the CMG gimbal generating torque which is applied to the satellite.

Other objects, benefits and features of the invention will be apparent from the following discussion of one or more embodiments.

BEST MODE FOR CARRYING OUT THE INVENTION

Figure 1:
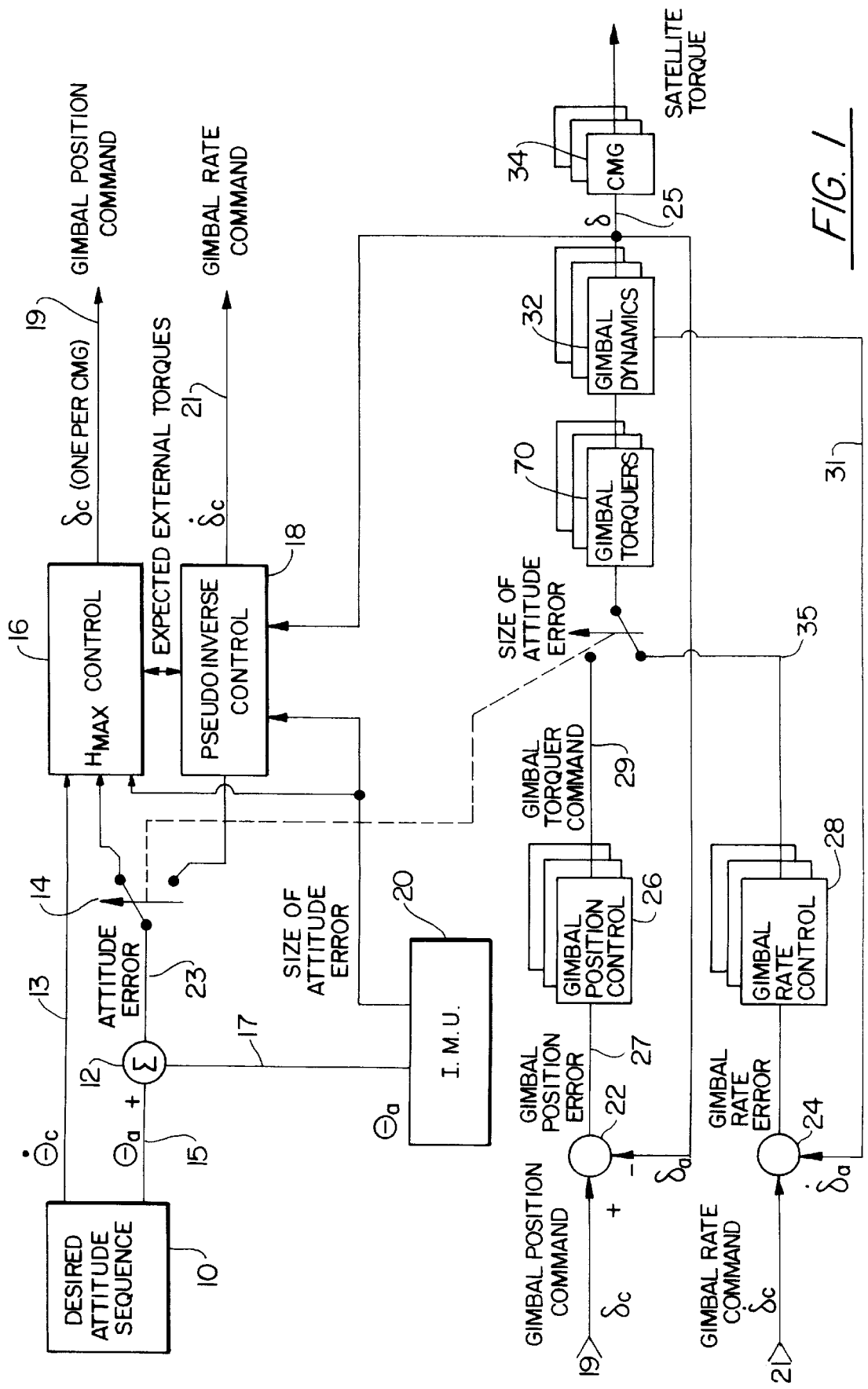
FIG. 1 is a functional block diagram showing a control embodying the present invention to rotate a satellite in response to commanded rotation signal $\Theta_{Commanded}$.
Figure 2:
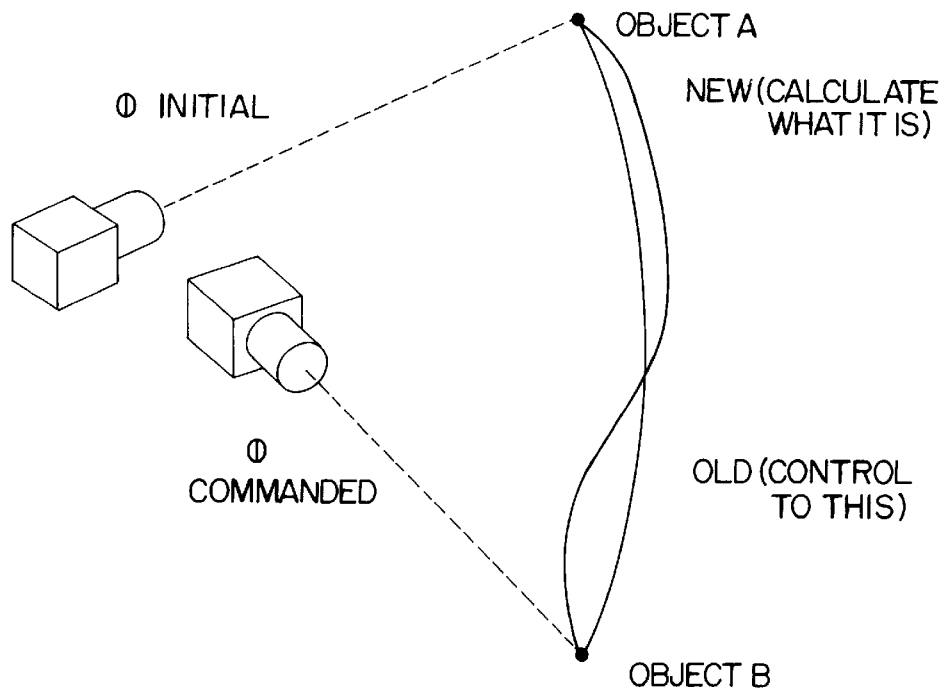
FIG. 2 illustrates the locus, using the prior art and the invention, when a satellite is rotated around its spherical center to pan a camera between two locations.

It should be appreciated that FIG. 1 shows function blocks signal processing that may be implemented through hardware or software, preferably the later in a computer based satellite control programmed to produce output signals to control CMGs on the satellite. In as much as computers are currently used to process such signals and others on a satellite, once the invention is understood, such programming is rudimentary. The computer and its associated peripherals therefore are not shown specifically in the FIG. 1.

Figure 3:
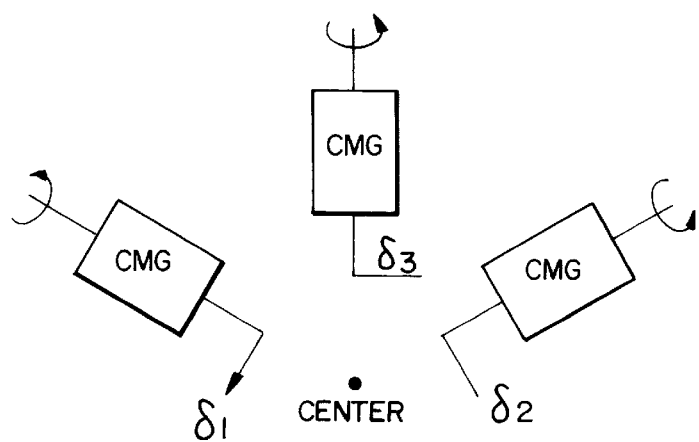
FIG. 3 shows three CMGs and a control (functionally detailed in FIG. 2) to produce torque signals to rotate each CMG.
Figure 3:
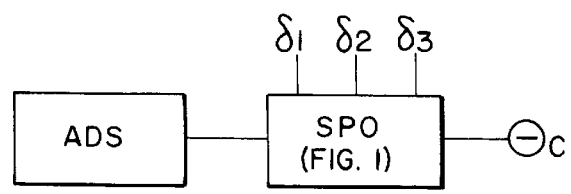

Fundamentally, the purpose for the process shown in FIG. 1 is to produce acceleration values for each CMG (see FIG. 3) on a satellite which when processed will cause each CMG to rotate at a certain angular rate, causing the satellite to rotate. For simplicity, the invention is explained in terms of producing one CMG response, but in actuality the process produces a response for each CMG.

Bearing that in mind and referring to FIG. 1, the desired satellite orientation is commanded by a supervisory control, Desired Attitude Sequence 10 or scheduler. The three dimensional attitude command $\Theta_c$ 13 is made up of $\Theta_1, \Theta_2, \Theta_3$ being the Euler angles, quaternion or some other convenient attitude description. This signal is compared 12 with the actual measured attitude $\Theta_a$ 17 generated by the IMU (Inertia Measurement Unit) 20. If the attitude error amplitude is grater than a predetermined amount then the control switch 14 is sent to the $H_{max}$ Control 16 rather than the Pseudo Inverse Control 18, the gimbal torque command 25 is switched at the same time. The $H_{max}$ control generates a gimbal angle (position) command $\delta_c$19, this is compared 22 with the actual gimbal angle $\delta_a$25. The Gimbal position error 27 is used by the Gimbal Position Control 26 to generate the gimbal torque command 29, the gimbal torquer 30 produce the torque, and the gimbal reacts to the torque 32 to generate a new gimbal angle, and new gimbal angle in the CMGs 34 produces torque on the satellite changing the satellites attitude. If however the amplitude of the attitude error 23 is less than the predetermined amount the attitude error is switched to the pseudo inverse control 18. The pseudo inverse control uses the attitude error to generate a desired torque $Q_c$, for the satellite. The desired torque is converted to desired gimbal rates by means of a pseudo inverse control law $\delta_c = H^{-1}A^T(AA^T)^{-1}Q_c$ where $H^{-1}$ is the inverse of the diagonal matrix of the angular momentums of the CMG array, and A is the Jacobian of the CMG angular momentum as a function of gimbal position $$A = \frac{\partial h}{\partial \delta}.$$

The gimbal rate command $\delta_c$ 21 is compared 24 to the actual gimbal rate $\delta_a$31, the gimbal rate error is used by the gimbal rate control 28 to generate gimbal torque command 35 and remainder of the control is like the $H_{max}$ control.

The Hmax control is a standard extended radius Newtonian Convergence (ERNC) routine. This technique requires that an initial guess at the solution be made and the solution is refined by the convergence routine. In the case of Hmax the Matlab code is:

[n a]=size(t);
st0=st(n,:)' Qe=qfromq(qq,st0(1:4)') J=[21.4 0 0; 0 20.7 0;0 0 2.5];
q=-J*Qe(1:3) xeq=[0.0001 1 4 0.001 0.001 0.001]';
xeq(2)=atan2(q(2),q(1));
angle=2*acos(qq(4))*180/pi xeq(3)=angle/8 qq is given as the next target quaternion. St0 is the initial conditions for the differential equation solver, the last point of the previous transient is the initial condition. St is the state variable matrix from a code, each row is the value of the state variable at the a corresponding time. The last time is used as the starting point for the next transient. Qe is the difference between the commanded quaternion qq and the starting quaternion st0(1:4). In the state variable array the first 4 are the quaternion, the next 3 are the body rates of the satellite, and the last 4 are the gimbal angles. The xeq's are the independent variables to be manipulated by ERN convergence routine.

Basically the initial guess is the latitude and longitude of the direction of rotation of the quaternion error. The latitude is small because no rotation in the yaw direction is needed. The longitude is arc tangent of the ration of the first two quaternions. This is an approximation because the values of the moment of inertial J11, and J22 are not equal but close. The latitude longitude reference is the X1 axis, increasing longitude is in the X2 axis direction, and increasing latitude is in the X3 direction.

The ERNC then integrates the differential equations starting with these initial conditions and looks at the first three quaternion values at the end of the run along with the three body rate errors. These size quantities need to be zero. If they are not, then each of the independent variable is perturbed in turn to form a Jacobian of the errors with respect to each of the independent variables. The change in the independent variable is minus the inverse of the Jacobian times the error vector. If the next step does not have smaller error from the previous one a fractional step is taken to reduce the error. This process continues until the error is less than 1e–8. Once the solution is achieved, the resulting trajectory becomes the reference for the $H_{max}$ control. The gimbal angles become the reference gimbal angles for the transient, these are trimmed if external disturbances cause the trajectory to drift.

With the benefit of the previous discussion of the invention, one of ordinary skill in the may be able to modify the invention in whole or in part without departing from the true scope and spirit of the invention.

What is claimed is:

1. An attitude control for a satellite comprising a plurality of controlled momentum gyros, an attitude controller comprising signal processing means for providing a gimbal rate signal, for each control momentum gyro, to operate an actuator to rotate each controlled momentum gyro to change the attitude of the satellite from a first attitude to a second attitude in respond to a commanded attitude signal and an inertial measurement unit for providing signals manifesting satellite rotation, characterized in that:

the signal processing means comprises:

means for producing an error signal manifesting the difference between the commanded attitude and an actual attitude manifested by a attitude signal produced by the inertial measurement unit;

means for producing said gimbal rate signal from a first control law when said error signal is less than a first value, said first control law limiting the rotation of the controlled momentum gyros to rotate the satellite at a rate that is less than the maximum rate available from the controlled momentum gyros;

means for producing said gimbal rate signal from a second control law when said error is greater than said first value, said second control law producing said gimbal rate signal, for each controlled momentum gyro, that cause all the controlled momentum gyros to be rotated to apply their respective stored angular momentum in a direction that is approximated by a great circle between the first attitude and the second attitude on an imaginary sphere with a center at the center of rotation of the satellite;

means for modifying said gimbal signal, based on a change in the actual attitude signal, during said second control law to maintain the rotation of the satellite in said direction;

the first control law comprises the application of pseudo inverse rules; and the second control comprises determining the rotation of the each control momentum gyro to rotate the satellite to the second attitude in the shortest time.

2. An attitude control for a satellite characterized by:

a plurality of controlled momentum gyros;

means for producing a command to rotate the satellite from a first to a second spherical location on an imaginary spherical surface around the satellite;

means for providing gimbal rate signals to the controlled momentum gyros;

means for determining a difference between actual satellite attitude as the satellite is rotated and a calculated attitude along the path, said means for providing gimbals rage signals being responsive to said difference for changing said gimbal signals to adjust the orientation of the satellite in two directions along a surface of the spherical surface as the satellite is rotated to the second location to reduce said difference and producing said gimbal rate signals from first and second control laws by determining that the first of said control laws will produce a singularity if all the controlled momentum gyros are rotated to apply their respective stored angular momentum in the same direction and selecting said second control law to provide said gimbal rate signals to the controlled momentum gyros to cause the satellite to rotate along a path on the spherical surface to the second spherical location in the shortest time; and means on the satellite for determining said actual satellite attitude.

3. An attitude control for a satellite comprising a plurality of controlled momentum gyros, an attitude controller comprising signal processing means for providing a gimbal rate signal, for each control momentum gyro, to operate an actuator to rotate each controlled momentum gyro to change the attitude of the satellite from a first attitude to a second attitude in respond to a commanded attitude signal second attitude and an inertial measurement unit for providing signals manifesting satellite rotation, characterized in that:

the signal processing means comprises:

means for producing said gimbal rate signal from first and second control laws, for determining that the first of said control laws will produce a singularity if all the controlled momentum gyros are rotated to apply their respective stored angular momentum in the same direction and for selecting said gimbal rate signal produced from the second control law to cause all the controlled momentum gyros to be rotated to apply their respective stored angular momentum in the same direction.

4. The attitude control described in claim 3, further characterized by:

means for modifying said gimbal signal, based on a change in the actual attitude signal from said first second control law to maintain the rotation of the satellite in said direction.

5. The attitude control described in claim 4, further characterized in that:

said direction is approximated by a great circle between the first attitude and the second attitude on an imaginary sphere with a center at the center of rotation of the satellite and said gimbal signal is modified to adjust the attitude of the satellite along the surface of said sphere.

* * * * *